United States Patent
Barsness et al.

(10) Patent No.: US 8,583,608 B2
(45) Date of Patent: Nov. 12, 2013

(54) MAXIMUM ALLOWABLE RUNTIME QUERY GOVERNOR

(75) Inventors: Eric L. Barsness, Pine Island, MN (US); Paul S. Nelsestuen, Oronoco, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 12/962,796

(22) Filed: Dec. 8, 2010

(65) Prior Publication Data
US 2012/0150895 A1 Jun. 14, 2012

(51) Int. Cl.
G06F 7/00 (2006.01)
G06F 17/00 (2006.01)

(52) U.S. Cl.
USPC .......................................... 707/693; 707/713

(58) Field of Classification Search
USPC .................................. 707/687, 693, 705, 713
See application file for complete search history.

(56) References Cited

U.S. PATENT DOCUMENTS

| | | | | |
|---|---|---|---|---|
| 6,263,342 | B1* | 7/2001 | Chang et al. | 707/103 |
| 7,127,449 | B2* | 10/2006 | Barsness et al. | 705/26.1 |
| 7,181,457 | B2* | 2/2007 | Reinauer et al. | 707/10 |
| 7,474,750 | B2* | 1/2009 | Lekatsas et al. | 380/269 |
| 7,512,591 | B2* | 3/2009 | Bildhaeuser et al. | 707/2 |
| 7,958,158 | B2* | 6/2011 | Bestgen et al. | 707/799 |
| 2008/0052720 | A1* | 2/2008 | Barsness et al. | 718/104 |

* cited by examiner

*Primary Examiner* — Marc Somers
(74) *Attorney, Agent, or Firm* — Patterson & Sheridan LLP (57) ABSTRACT

Techniques for managing query execution using memory compression based on maximum allowable runtimes. Embodiments may receive a query from a requesting entity and calculate an estimated execution time for executing the query. Embodiments may further determine a maximum allowable runtime for the query. An amount of memory compression for use in processing the query may then be adjusted, based on the estimated execution time and the maximum allowable runtime. The query may then be executed using the adjusted memory compression rate to produce a set of query results, which may then be returned to the requesting entity.

20 Claims, 5 Drawing Sheets

MAXIMUM ALLOWABLE RUNTIME QUERY GOVERNOR

BACKGROUND

The present invention generally relates to database management, and more particularly, to managing query execution using a query governor.

Databases are computerized information storage and retrieval systems. A relational database management system is a computer database management system (DBMS) that uses relational techniques for storing and retrieving data. An object-oriented programming database is a database that is congruent with the data defined in object classes and subclasses.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests (i.e., queries) are often made using high-level query languages such as the Structured Query Language (SQL). Upon receiving such a request, the DBMS may execute the request against a corresponding database, and return any result of the execution to the requesting entity.

As databases grow in size and in workload, particular queries or requests may take a substantial amount of time and resources to execute. As such, database administrators may wish to control how long queries on a database system may execute.

SUMMARY

Embodiments of the invention provide a method, product and system for managing query execution. The method, product and system include receiving a query for processing from a requesting entity. Additionally, the method, product and system include calculating an estimated execution time for executing the received query. The estimated execution time approximates an amount of time the received query will take to execute. A maximum allowable runtime for the received query is then determined. The method, product and system include also include adjusting an amount of memory compression used in executing the received query, based at least in part on the estimated execution time and the maximum allowable runtime for the received query. The query is then executed using the adjusted amount of memory compression.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Since all computers have a limited amount of system resources for use in running programs, proper resource management is important to ensure that these limited resources are effectively utilized. To this end, in a database system, database administrators may wish to restrict how long a particular query may run when executed. That is, if executing a particular query would tie up system resources for an excessive amount of time, to the detriment of the execution other queries and tasks on the system, the database administrators may wish to reject the query for execution. Such a rejection may be definitive (e.g., a message may be returned to the requesting entity, explaining the query was denied for processing) or the execution may be delayed to another time (e.g., the system may process the query once system resources become idle). This ensures that no single database query may monopolize the resources of the system.

Although the memory resources of a computer may be fixed, one technique for effectively increasing the memory resources is by compressing data stored therein. For example, assume a particular file has a storage size of 100 megabytes. If the particular file is then read into system memory, it will consume 100 megabytes of space in memory, but if the particular file is compressed at a compression rate of 50%, the compressed file will only consume 50 megabytes of space in memory. One example of such a memory compression technique is the Active Memory Expansion component available on POWER7™ platforms by International Business Machines ("IBM"). Although such a technique may increase the time required to process requests using the compressed data, because additional processing resources are used to compress and decompress the data, in many situations, the processing costs may be outweighed by the gains in memory capacity.

Embodiments of the invention may receive a query for processing from a requesting entity and, responsive to receiving the query, may calculate an estimated execution time for executing the query. The estimated execution time generally reflects an approximation of how long the query will take to execute. Furthermore, embodiments may estimate this time using historical data, collected from processing previous queries. Embodiments may then determine a maximum allowable runtime for the query. Such a maximum allowable runtime may be a predetermined value applied to all queries, or may be determined based on specific attributes associated with the query. Upon determining the maximum allowable runtime for the query, embodiments may optimize the query by adjusting an amount of memory compression used in processing the query. The optimization may be based on the estimated execution time and the maximum allowable runtime for the received query. The optimized query may then be executed to produce query results, which may in turn be returned to the requesting entity.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a database management system or "DBMS") or related data available in the cloud. For example, the DBMS could execute on a computing system in the cloud and receive queries pertaining to one or more databases managed by the DBMS. In such a case, a memory compression query governor 182 could monitor incoming queries and, for each query, calculate an estimated execution time for executing the query. The query governor 182 may also determine a maximum allowable runtime for the query, and may adjust an amount of memory compression used in processing the query based on the estimated execution time and the maximum allowable runtime for the query. Doing so allows a user to submit queries from any computing system attached to a network connected to the cloud (e.g., the Internet), and helps to ensure no single query consumes an impermissible amount of system resources during execution.

Figure 1A:
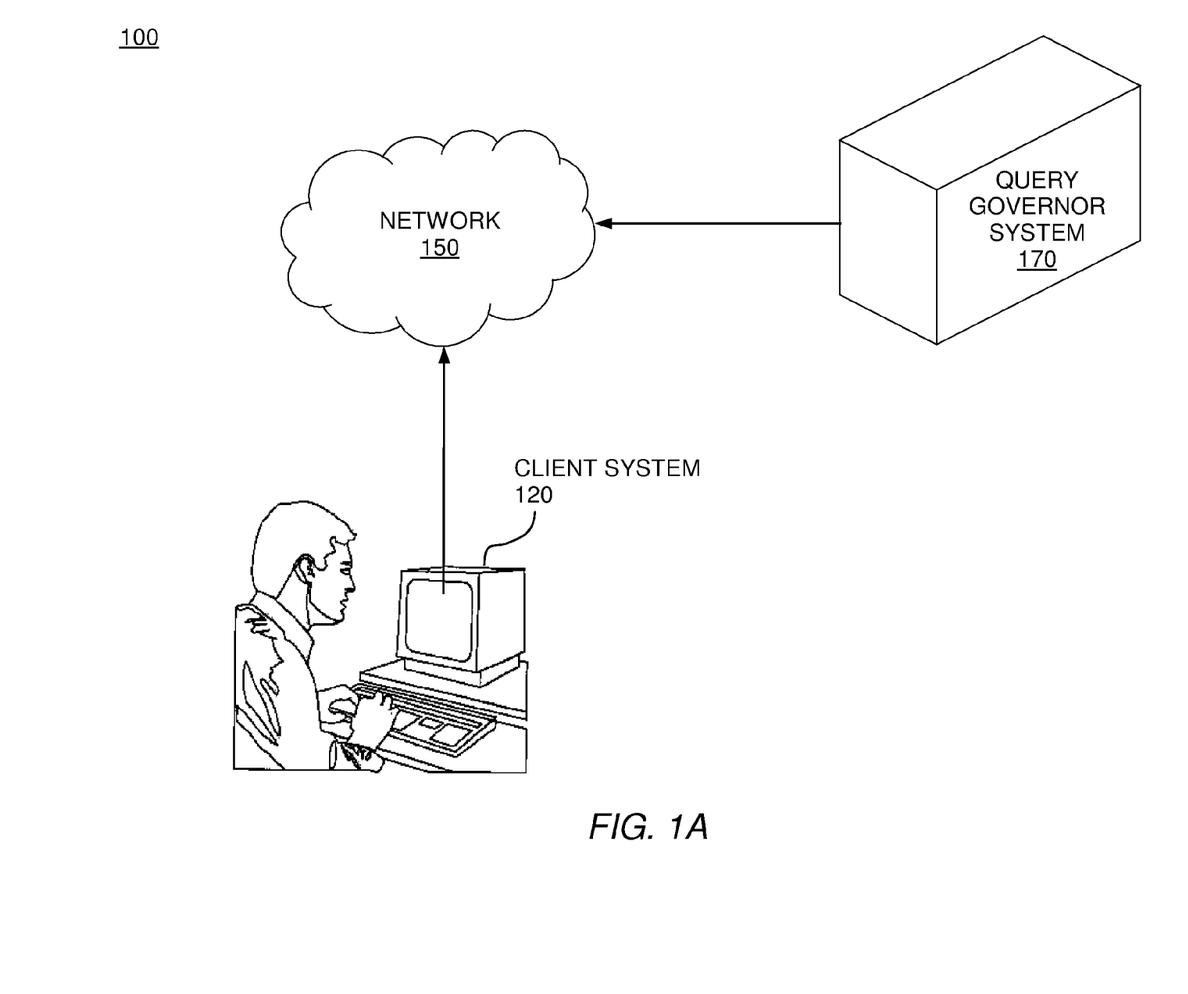
FIGS. 1A-1B are block diagrams illustrating systems configured to run a memory compression query governor, according to embodiments of the present invention.
Figure 1B:
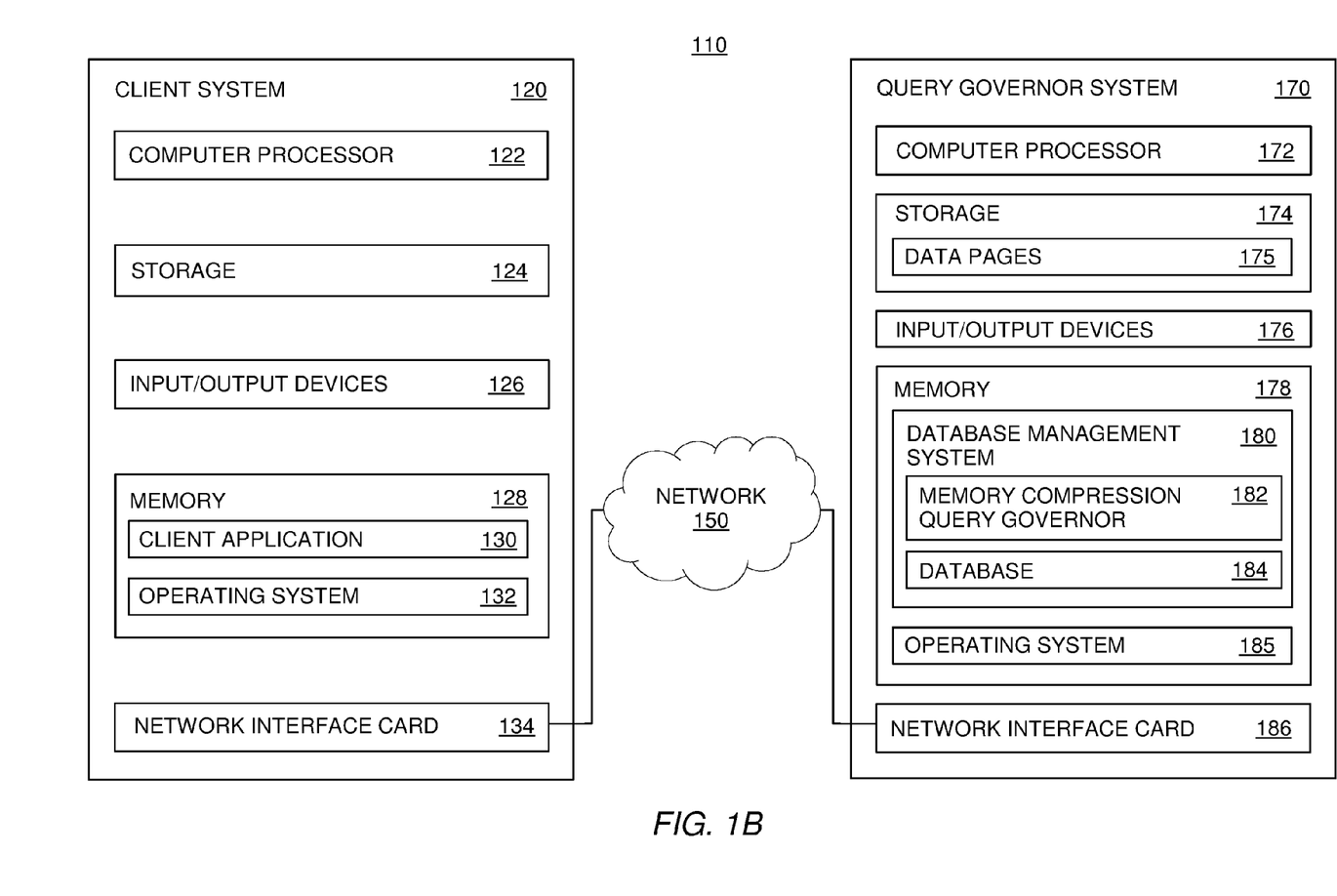

Referring now to FIGS. 1A-1B, FIGS. 1A-1B are block diagrams illustrating systems configured to run a memory compression query governor, according to embodiments of the present invention. More specifically, FIG. 1A is a block diagram illustrating a networked system for managing query execution using a query governor. As shown, the system 100 includes a client system 120 and a database server 170 (also referred to herein as a query governor system), connected by a network 150. Generally, the client system 120 may submit requests (i.e., queries) over the network 150 to a DBMS running on the database server 170. The term "query" denotes a set of commands for retrieving data from a stored database. Queries may take the form of a command language, such as the Structured Query Language (SQL), and enable programmers and programs to select, insert, update, and determine the location of data in the database.

Generally speaking, any requesting entity (i.e., different query types) can issue queries against data in a database. For example, software applications (such as by an application running on the client system 120), operating systems, and, at the highest level, users may submit queries to the database. These queries may be predefined (i.e., hard coded as part of an application) or may be generated in response to input (e.g., user input). Upon receiving the request, the DBMS on the database server 170 may execute the request on a database specified in the request, and then return a result of the executed request.

According to one embodiment of the invention, upon receiving a query for processing, a query governor on the query governor system 170 may calculate an estimated execution time for the received query. The estimated execution time generally reflects an amount of time it will take the DBMS to execute the received query. The query governor may calculate the estimated execution time using historical data collected from processing previous queries. As an example, assume that three previous queries containing SELECT statements for a particular database table took 15 seconds, 20 seconds and 25 seconds to execute. If the query governor system 170 then receives another query containing a SELECT statement for the particular database table, the query governor may estimate that the query will take 20 seconds to execute (i.e., the average of the three previous execution times).

Once the estimated execution time is calculated, the query governor may then determine a maximum allowable runtime for the query. Generally, the maximum allowable runtime specifies a threshold amount of the time that the query should finish executing within. In one embodiment, the user or application submitting the query may specify the maximum allowable runtime as part of the query. For example, the query may include a SQL tag specifying the maximum allowable runtime. In another embodiment, the query governor may retrieve the maximum allowable runtime associated with the query from one or more configuration files. Upon determining the maximum allowable runtime for the query, the query governor adjusts an amount of memory compression that will be used in processing the query, based on the estimated execution time and the maximum allowable runtime for the query. That is, as discussed above, the more memory compression that is used in processing the query, the longer the query will take to process, since additional processing resources are consumed in compressing and decompressing the data. Accordingly, the query governor may adjust the amount of memory compression to an amount where the query may still execute within the maximum allowable time. The DBMS may then execute the query using the adjusted amount of memory compression, and once the query is executed, any results produced from executing the query may be returned to the requesting entity from which the query was received.

Advantageously, by doing this, embodiments of the invention may minimize the amount of memory that individual queries may consume on the database systems, while ensuring that the queries still finish executing within the maximum allowable runtime. By doing this, embodiments may prevent a situation where a particular query consumes a substantial portion of the system resources, to the detriment of other queries and tasks on the database systems. Furthermore, embodiments of the invention may manage query execution in a way that does not simply reject the query for processing. Rather, embodiments of the invention may still process a query whose initial estimated execution time exceeds the maximum allowable runtime by using reducing the amount of memory compression used in processing the query. By doing this, embodiments process the received query while still minimizing memory usage on the database systems.

FIG. 1B is a block diagram illustrating a system configured to run a memory compression query governor, according to one embodiment of the present invention. As shown, the system 110 contains the client system 120 and the database server 170. The client system 120 contains a computer processor 122, storage media 124, I/O devices 126, memory 128 and a network interface card 134. Computer processor 122 may be any processor capable of performing the functions described herein. The client system 120 may connect to the network 150 using the network interface card 134. Furthermore, as will be understood by one of ordinary skill in the art, any computer system capable of performing the functions described herein may be used.

Illustratively, memory 128 contains a client application 130 and an operating system 132. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The client application 130 is generally capable of generating database queries. Once the client application 130 generates a query, the query may be submitted to a server (e.g., DBMS 180) for execution, using the network 150. The operating system 132 may be any operating system capable of performing the functions described herein.

The database server 170 contains a computer processor 172, storage media 174, I/O devices 176, memory 178 and a network interface 186. Computer processor 172 may be any processor capable of performing the functions described herein. As shown, storage media 174 contains data pages 175. The data pages 175 generally contain one or more rows of data. In one embodiment of the invention, data contained in the data pages 175 is associated with one or more key values in the database 184. I/O devices 176 may represent a variety of input and output devices, including keyboards, mice, visual displays, printers and so on. The database server 170 may connect to the network 150 using the network interface card 186. Furthermore, as will be understood by one of ordinary skill in the art, any computer system capable of performing the functions described herein may be used.

In the pictured embodiment, memory 178 contains an operating system 185 and a database management system (hereinafter "DBMS") 180. Although memory 178 is shown as a single entity, memory 178 may include one or more memory devices having blocks of memory associated with physical addresses, such as random access memory (RAM), read only memory (ROM), flash memory or other types of volatile and/or non-volatile memory. The DBMS 180 contains a memory compression query governor 182 and a database 184. The operating system 185 may be any operating system capable of performing the functions described herein.

As discussed above, when the DBMS 180 receives a query for processing, the query governor 182 may calculate an estimated execution time for processing the query. The query governor 182 may then determine a maximum allowable runtime for the received query. In one embodiment, the maximum allowable runtime is specified as part of the query. In another embodiment, the maximum allowable runtime is specified in a configuration file. The query governor 182 may then optimize the query by adjusting an amount of memory compression used in executing the query. Such optimize may include enabling memory compression for processing the query, if memory compression is disabled, or may include increasing or decreasing the compression rate used in processing the query. Once the query is optimized, the DBMS 180 may execute the query against the database 184 to produce a set of query results. The DBMS 180 may then return the set of query results to the requesting entity from which the query was received.

In one embodiment, the query governor 182 optimizes the query so that the actual execution time of the query is at or near the maximum allowable runtime for the query. By doing this, the query governor 182 may ensure that the query executes in an acceptable amount of time, while minimizing the amount of memory used in processing the query. As discussed above, because additional memory compression may result in additional processing activity, queries executed using a high amount of memory compression may take longer to execute than queries executed using a low amount or no memory compression. Thus, by adjusting the amount of memory compression so that the execution time of the query is at or near the maximum allowable runtime, the query governor 182 may conserve memory resources on the query governor system 170 while still ensuring that queries execute in an acceptable amount of time.

In one embodiment, the query governor 182 may consider other factors when determining the maximum allowable runtime for the query. Such factors may include, without limitation, the origin of the query, a priority value associated with the query, and a class of the query. For instance, assume that there are two applications which submit queries to the DBMS 180: a mission-critical real-time application with a high priority value and a logging application for collecting database statistics with a low priority value. In such an example, the query governor 182 may assign a lower maximum allowable runtime to queries received from the mission-critical application than for queries received from the logging application. The DBMS 180 may accordingly use less memory compression in processing queries received from the higher-priority mission-critical application and accordingly expedite the processing of these queries. That is, because the use of memory compression may consume additional processing resources on the database systems, queries that are processed using a greater amount of memory compression may take longer to process than queries processed using a lesser amount or no memory compression. Thus, by setting a lower maximum allowable runtime for the processing of queries received from higher-priority application, the query governor 182 may process these queries more quickly. At the same time, the query governor 182 may set a higher maximum allowable runtime for the processing of queries received from the lower-priority application, in order to use memory compression techniques to conserve system memory in executing these queries.

Figure 2:
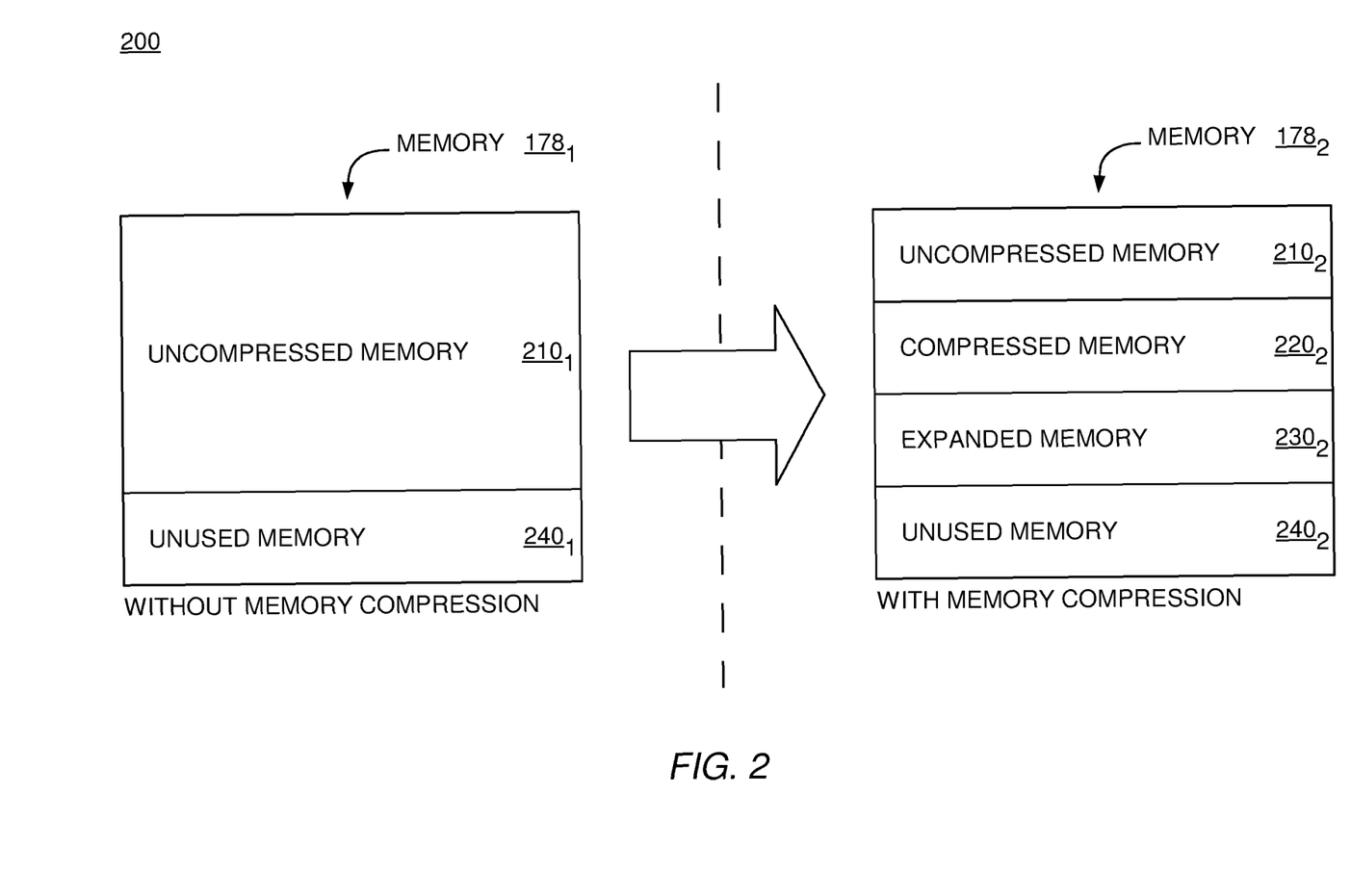
FIG. 2 is a block diagram illustrating the effects of memory compression, according to one embodiment of the present invention.

FIG. 2 is a block diagram illustrating the effects of memory compression, according to one embodiment of the present invention. In the depicted example, note that the memory $178_1$ without memory compression enabled has the same physical data storage capacity as the memory $178_2$ with memory compression enabled. As shown, the memory $178_1$ contains a portion of uncompressed memory $210_1$ and a portion of unused memory $240_1$. The uncompressed portion of memory $210_1$ may store data used by one or more applications that is not compressed. The unused pool $240_1$, in turn, represents an unused data capacity of the memory $178_1$, in which no data is currently stored.

The memory $178_2$, in contrast, contains an uncompressed portion $210_2$, a compressed portion $220_2$, an expanded portion $230_2$ and an unused portion $240_2$ of memory. In this example, the memory $178_2$ effectively contains the same data as the memory $178_1$, but does so using memory compression. Thus, in the depicted example, the uncompressed memory $210_2$ relates to a portion of the uncompressed memory $210_1$. Likewise, the compressed memory $220_2$ relates to the remaining portion of the uncompressed memory $210_1$. That is, due to the use of memory compression, the data from uncompressed memory $210_1$ may be stored in uncompressed memory $210_2$ and compressed memory $220_2$ which, when combined, are smaller in size than the uncompressed memory $210_1$.

Advantageously, by using memory compression, embodiments of the invention may effectively create the expanded memory pool $230_2$, which may in turn be used to store additional data, either compressed or uncompressed. For example, a DBMS may use the expanded memory $230_2$ to store additional data during fetches to a storage media 174. Additionally, such memory compression not only expands available memory, but because the expanded memory $230_2$ may be used for other purposes, may also reduce paging on the database system as a result. Advantageous, because paging often leads to a greater delay than compressing and decompressing data, the memory compression may improve the performance of the database system as well. Furthermore, although FIG. 2 shows the various portions of memory as being contiguous, in practice, memory regions allocated to a pool may be fragmented. One of ordinary skill in the art will recognize, however, that in this example it is the amount of memory 178 occupied by each portion that is significant.

Figure 3:
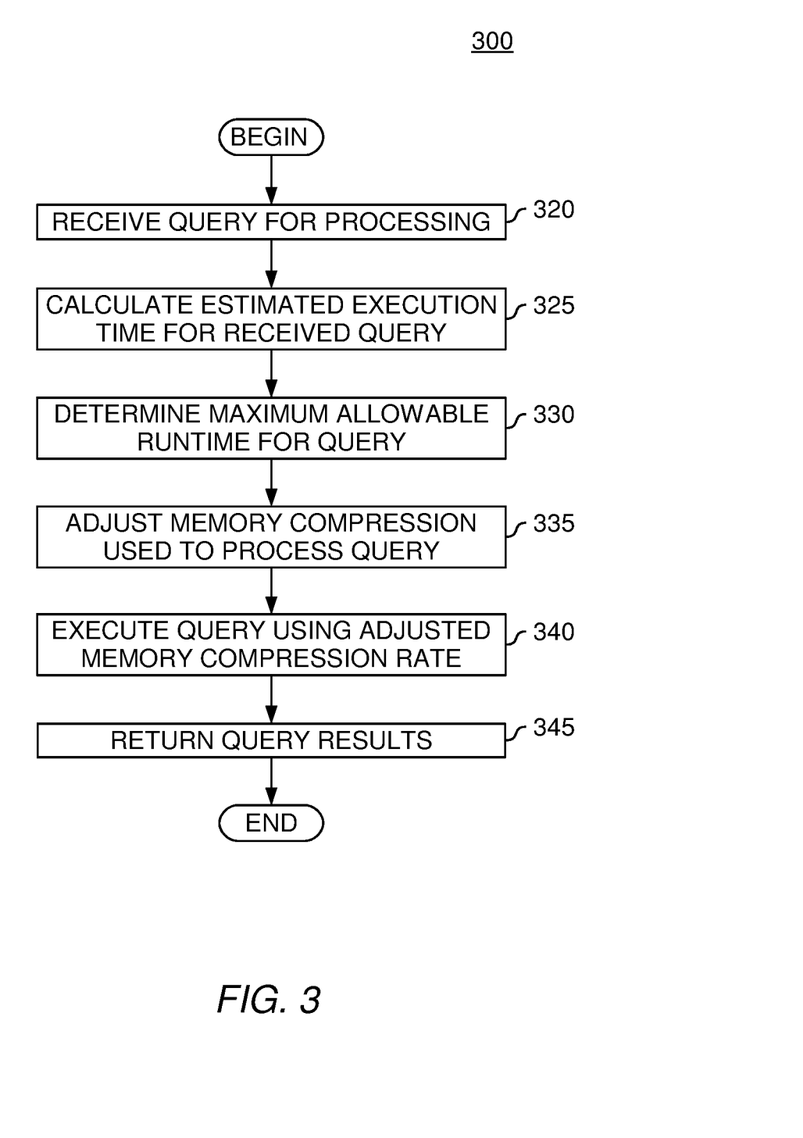
FIG. 3 is a flow diagram illustrating a method for managing query runtime, according to one embodiment of the present invention.

FIG. 3 is a flow diagram illustrating a method for managing query runtime, according to one embodiment of the present invention. As shown, the method 300 begins at step 320, where a DBMS receives a query from a requesting entity for processing. Such a requesting entity may be received from another software application (e.g., client application 130) and may be a predefined query or a user-specified query. Upon receiving the query, the query governor 182 calculates an estimated execution time for processing the received query (step 325). The estimated execution time generally reflects an amount of time the received query will take to execute. The query governor 182 may calculate the estimated execution time using historical data collected from previously processed queries.

The query governor 182 then determines a maximum allowable runtime for the received query (step 330). As discussed above, the maximum allowable runtime generally refers to a threshold amount of time the received query should finish executing within. In one embodiment, the maximum allowable runtime may be specified (e.g., by the requesting entity) in the received query. In such an embodiment, the maximum allowable runtime may be defined using one or more SQL tags in the received query. In another embodiment, the maximum allowable runtime may be defined in a configuration file.

Additionally, the query governor 182 may determine the maximum allowable runtime based on a priority level or a class of the query. For example, assume a particular DBMS receives queries that may be classified as either high priority, medium priority or low priority. If the query governor 182 determines a particular received query is a high priority query, the query governor 182 may assign a relatively low maximum allowable runtime to the query. That is, because the query is of high importance, the query should generally be processed in a short amount of time. As a second example, if the query governor 182 determines a second received query is a low priority query, the query governor 182 may assign a relatively high maximum allowable runtime to the second query. That is, since the query is of low priority, it may be less important to process the query in a short amount of time, as compared to the processing of the high priority query. Furthermore, in one embodiment, the maximum allowable runtime is specified as a flat amount of time (e.g., 60 seconds). In another embodiment, the maximum allowable runtime is determined using an execution time adjustment threshold, which specifies a maximum percentage that the estimated execution time may be increased (e.g., 20%).

Once the maximum allowable runtime is determined, the query governor 182 adjusts the amount of memory compression used to process the received query (step 335). As discussed above, generally speaking, the more memory compression used in processing a particular query, the longer the processing of the particular query will take. That is, because the database system (e.g., query governor system 170) uses additional processing resources compressing and decompressing data when memory compression is enabled, these additional processing resources may not be used in the processing of the query. Accordingly, if the query governor 182 determines that the estimated execution time for a query is substantially less than the maximum allowable runtime for the query, the query governor 182 may increase the amount of memory compression used in processing the query. In one embodiment, the query governor 182 may increase the amount of memory compression (and thus the execution time of the query) until the estimated execution time for the query is at or near the maximum allowable runtime. By doing this, the query governor 182 may conserve the memory resources of the database system, while ensuring that the query will still execute within the maximum allowable runtime.

Once the amount of memory compression is adjusted, the DBMS 180 executes the query using the adjusted memory compression rate (step 340). The DBMS 180 may then return a set of query results produced by executing the query to the requesting entity from which the query originated (step 345). Once the set of query results are returned, the method 300 ends. One advantage to the method 300 is that because the amount of memory compression used in processing queries is adjusted based at least in part on a maximum allowable runtime for the query, embodiments may conserve system resources (i.e., memory 178) while still ensuring that queries are executed in an acceptable amount of time (i.e., within the maximum allowable runtime).

Figure 4A:
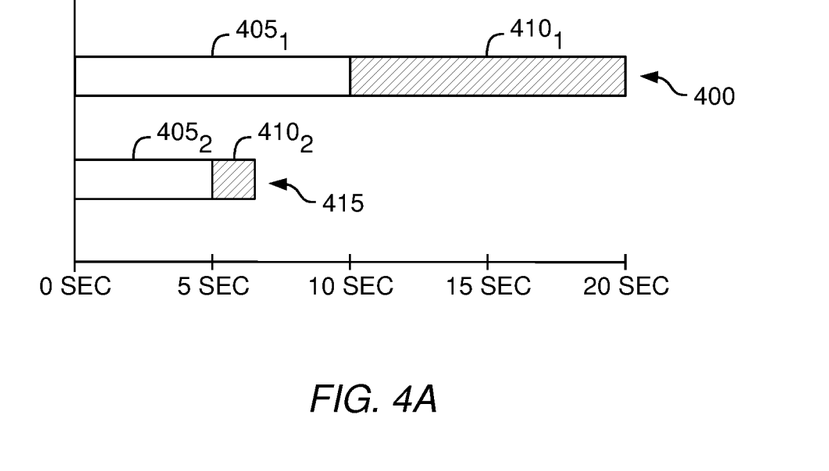
FIGS. 4A-4B are timeline diagrams illustrating the effects of memory compression on query runtime, according to embodiments of the present invention.
Figure 4B:
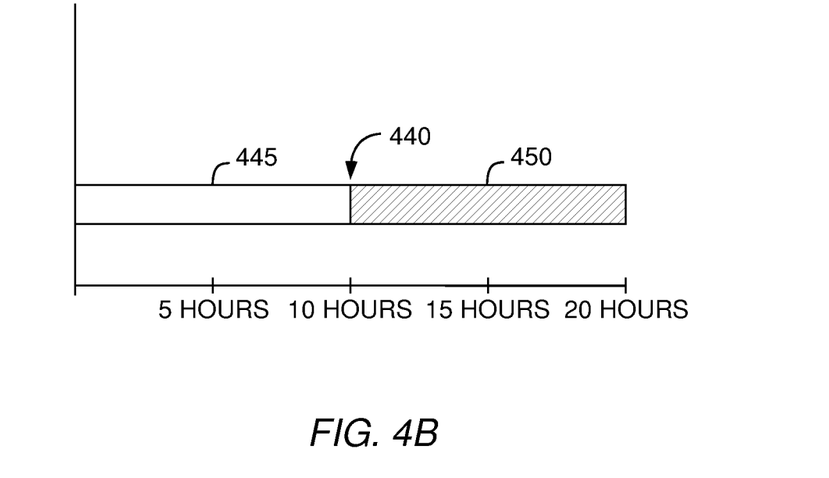

FIGS. 4A-4B are timeline diagrams illustrating the effects of memory compression on query runtime, according to embodiments of the present invention. For purposes of the discussion of FIGS. 4A and 4B, assume that the depicted timelines represent the execution of exemplary database queries. As shown, FIG. 4A contains two timelines 400 and 415. As shown, the timeline 400 represents a first database query with an execution time of 20 seconds. In this example, the non-shaded portion $405_1$ represents the initial estimated execution time for the query, and the shaded portion $410_1$ represents the additional execution time added due to the use of memory compression. Furthermore, for the purposes of this example, assume that the query represented by timeline 400 is a low priority query and that the query governor 182 is configured to use an execution time adjustment threshold of 100% for low priority queries. Accordingly, the query governor 182 has determined that the maximum allowable runtime for the query is 20 seconds (a percentage increase of 100% from the original 10 second estimated execution time), thus allowing the query governor 182 to use an amount of memory compression that will double the execution time of the query.

In contrast, the second timeline 415 represents a high priority query with a total execution time of 6 seconds. As shown, the non-shaded portion $405_2$ represents the initial estimated execution time for the query, and the shaded portion $410_2$ represents the additional execution time added due to the use of memory compression. Furthermore, assume that the query governor 182 is configured to use an execution time adjustment threshold of 20% for high priority queries. In this example, because the query represented by the timeline 415 is a high priority query, the query governor 182 has determined that the maximum allowable runtime for the query is 6 seconds (a percentage increase of 20% from the original 5 second estimated execution time). That is, because the query is a high priority query, the query governor 182 may minimize any delay to the processing of the query by using a lower maximum allowable runtime. Accordingly, the query governor 182 may determine that less memory compression (relative to the query depicted by timeline 400) should be used for processing the query depicted by the timeline 415.

FIG. 4B contains a timeline 440 that represents a query with an execution time of 20 hours. In this example, the non-shaded portion 445 represents the initial estimated execution time for the query, and the shaded portion 450 represents the additional execution time added due to the use of memory compression. In this example, the query governor 182 has determined that because the initial estimated execution time for the query (i.e., the portion 445) is sufficiently long that the requesting entity submitting the query will not expect any returned results quickly, the query governor 182 has set a high maximum allowed runtime of 20 hours for processing the query. In other words, because the query was estimated to take a substantial amount of time of 10 hours to process using no memory compression (as shown by portion 445), the query governor 182 may determine that it is unlikely that a user submitting the query will notice or mind an additional delay in processing the query. As such, the query governor 182 may be configured to use an execution time adjustment threshold of 100% for such queries. Accordingly, in this example, the query governor 182 has determined that the maximum allowable runtime for the query is 20 hours (a percentage increase of 100% from the original 10 hour estimated execution time), thus allowing the query governor 182 to use a substantial amount of memory compression in processing the query.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing query execution, comprising:
   receiving a query for processing from a requesting entity;
   calculating an estimated execution time for executing the received query, wherein the estimated execution time approximates an amount of time the received query will take to execute;
   determining a maximum allowable runtime for the received query;
   adjusting an amount of memory compression used in executing the received query, based at least in part on the estimated execution time and the maximum allowable runtime for the received query; and
   issuing the query for execution using the adjusted amount of memory compression and by operation of one or more computer processors.

2. The computer-implemented method of claim 1, wherein determining a maximum allowable runtime for the received query further comprises retrieving the maximum allowable runtime from a configuration file.

3. The computer-implemented method of claim 1, wherein the received query specifies the maximum allowable runtime.

4. The computer-implemented method of claim 1, wherein the maximum allowable runtime for the received query is determined based on an execution time adjustment threshold which specifies a maximum amount of time for extending the execution of the received query.

5. The computer-implemented method of claim 4, wherein the execution time adjustment threshold comprises a maximum percentage value for increasing the estimated execution time.

6. The computer-implemented method of claim 1, wherein determining the maximum allowable runtime for the received query is based on at least one of (i) the requesting entity submitting the query, (ii) a priority value for the query, and (iii) a class of the query.

7. The computer-implemented method of claim 1, wherein calculating an estimated execution time for executing the received query is further based on historical usage data collected from previously executed queries.

8. A computer program product for managing query execution, comprising:
   a non-transitory computer-readable storage medium having computer readable program code embodied therewith, the computer readable program code comprising:
      computer readable program code to receive a query for processing from a requesting entity;
      computer readable program code to calculate an estimated execution time for executing the received query, wherein the estimated execution time approximates an amount of time the received query will take to execute;
      computer readable program code to determine a maximum allowable runtime for the received query;
      computer readable program code to adjust an amount of memory compression used in executing the received query, based at least in part on the estimated execution time and the maximum allowable runtime for the received query; and
      computer readable program code to issue the query for execution using the adjusted amount of memory compression.

9. The computer program product of claim 8, wherein the computer readable program code to determine a maximum allowable runtime for the received query further comprises:
   computer readable program code to retrieve the maximum allowable runtime from a configuration file.

10. The computer program product of claim 8, wherein the received query specifies the maximum allowable runtime.

11. The computer program product of claim 8, wherein the maximum allowable runtime for the received query is determined based on an execution time adjustment threshold which specifies a maximum amount of time for extending the execution of the received query.

12. The computer program product of claim 11, wherein the execution time adjustment threshold comprises a maximum percentage value for increasing the estimated execution time.

13. The computer program product of claim 8, wherein the computer readable program code to determine the maximum allowable runtime for the received query is based on at least one of (i) the requesting entity submitting the query, (ii) a priority value for the query, and (iii) a class of the query.

14. The computer program product of claim 8, wherein the computer readable program code to calculate an estimated execution time for executing the received query is further based on historical usage data collected from previously executed queries.

15. A system, comprising:
   a computer processor; and
   a memory containing a program that, when executed on the computer processor, performs an operation for managing query execution, comprising:
      receiving a query for processing from a requesting entity;
      calculating an estimated execution time for executing the received query, wherein the estimated execution time approximates an amount of time the received query will take to execute;
      determining a maximum allowable runtime for the received query;
      adjusting an amount of memory compression used in executing the received query, based at least in part on the estimated execution time and the maximum allowable runtime for the received query; and issuing the query for execution using the adjusted amount of memory compression.

16. The system of claim 15, wherein the received query specifies the maximum allowable runtime.

17. The system of claim 15, wherein the maximum allowable runtime for the received query is determined based on an execution time adjustment threshold which specifies a maximum amount of time for extending the execution of the received query.

18. The system of claim 17, wherein the execution time adjustment threshold comprises a maximum percentage value for increasing the estimated execution time.

19. The system of claim 15, wherein determining the maximum allowable runtime for the received query is based on at least one of (i) the requesting entity submitting the query, (ii) a priority value for the query, and (iii) a class of the query.

20. The system of claim 15, wherein calculating an estimated execution time for executing the received query is further based on historical usage data collected from previously executed queries.

* * * * *